United States Patent
Ayer

[11] 3,901,105
[45] Aug. 26, 1975

[54] HOLDER FOR CHAIN-SAW SHARPENING FILES

[75] Inventor: Lloyd M. Ayer, Hamden, Conn.

[73] Assignee: High Precision Incorporated, Hamden, Conn.

[22] Filed: Oct. 18, 1974

[21] Appl. No.: 516,125

[52] U.S. Cl. .......................... 76/36; 29/80
[51] Int. Cl.² .................. B23D 63/12; B23D 71/04
[58] Field of Search .............. 29/78, 80; 76/36

[56] References Cited
UNITED STATES PATENTS

| | | | |
|---|---|---|---|
| 2,850,923 | 9/1958 | Gommel | 76/36 |
| 3,166,956 | 1/1965 | Watro | 76/36 |
| 3,327,567 | 6/1967 | Penberthy | 76/36 |
| 3,518,900 | 7/1970 | Ehlen et al. | 76/36 |
| 3,670,600 | 6/1972 | Arff | 76/36 |

Primary Examiner—Harrison L. Hinson
Attorney, Agent, or Firm—St. Onge Mayers Steward & Reens

[57] ABSTRACT

A holder for chain-saw sharpening files of various sizes, which has a guide-bar and means for accurately locating the selected file relative to the guide-bar in order to sharpen the cutting edge of each chain-saw cutter at a predetermined angle.

3 Claims, 7 Drawing Figures

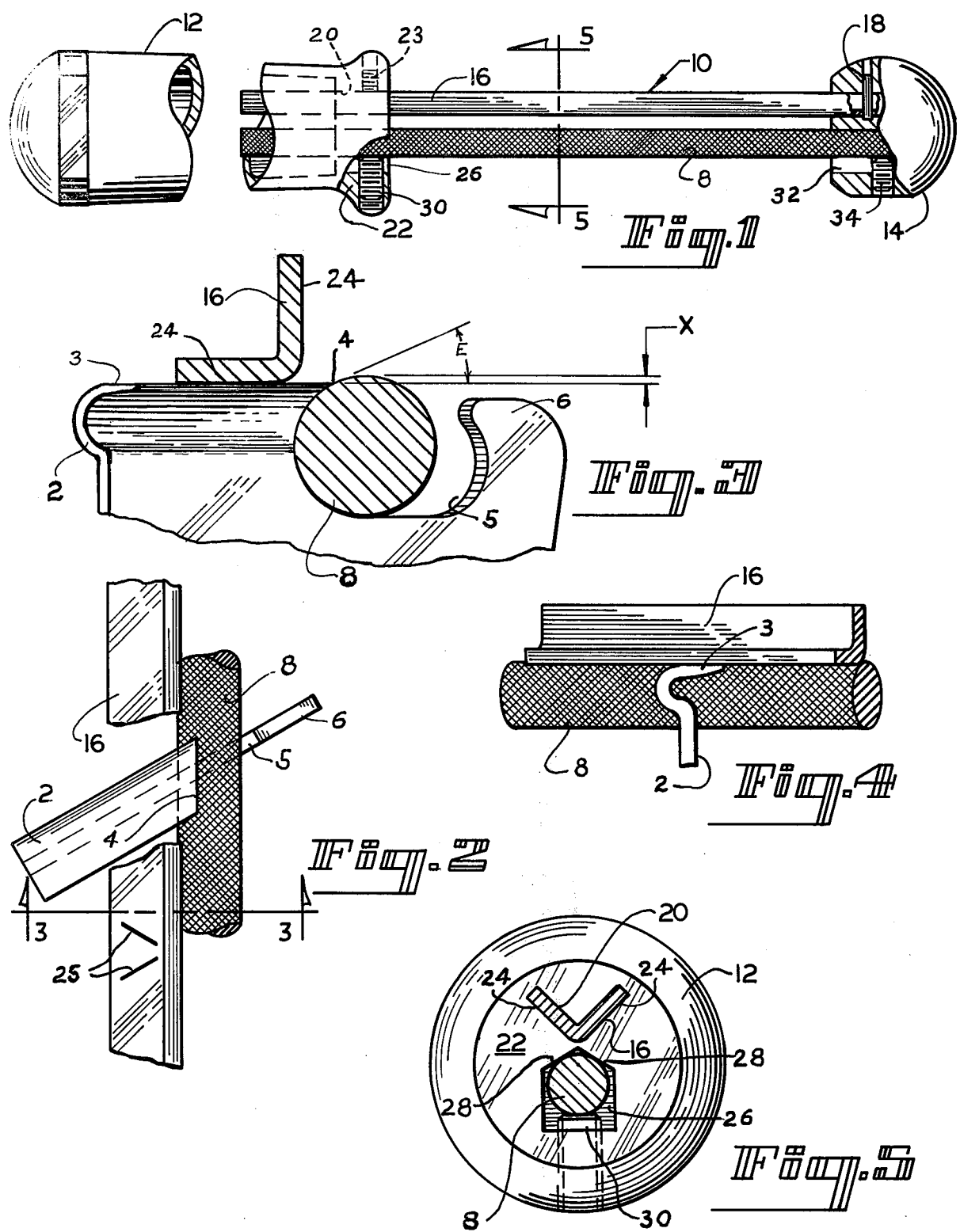

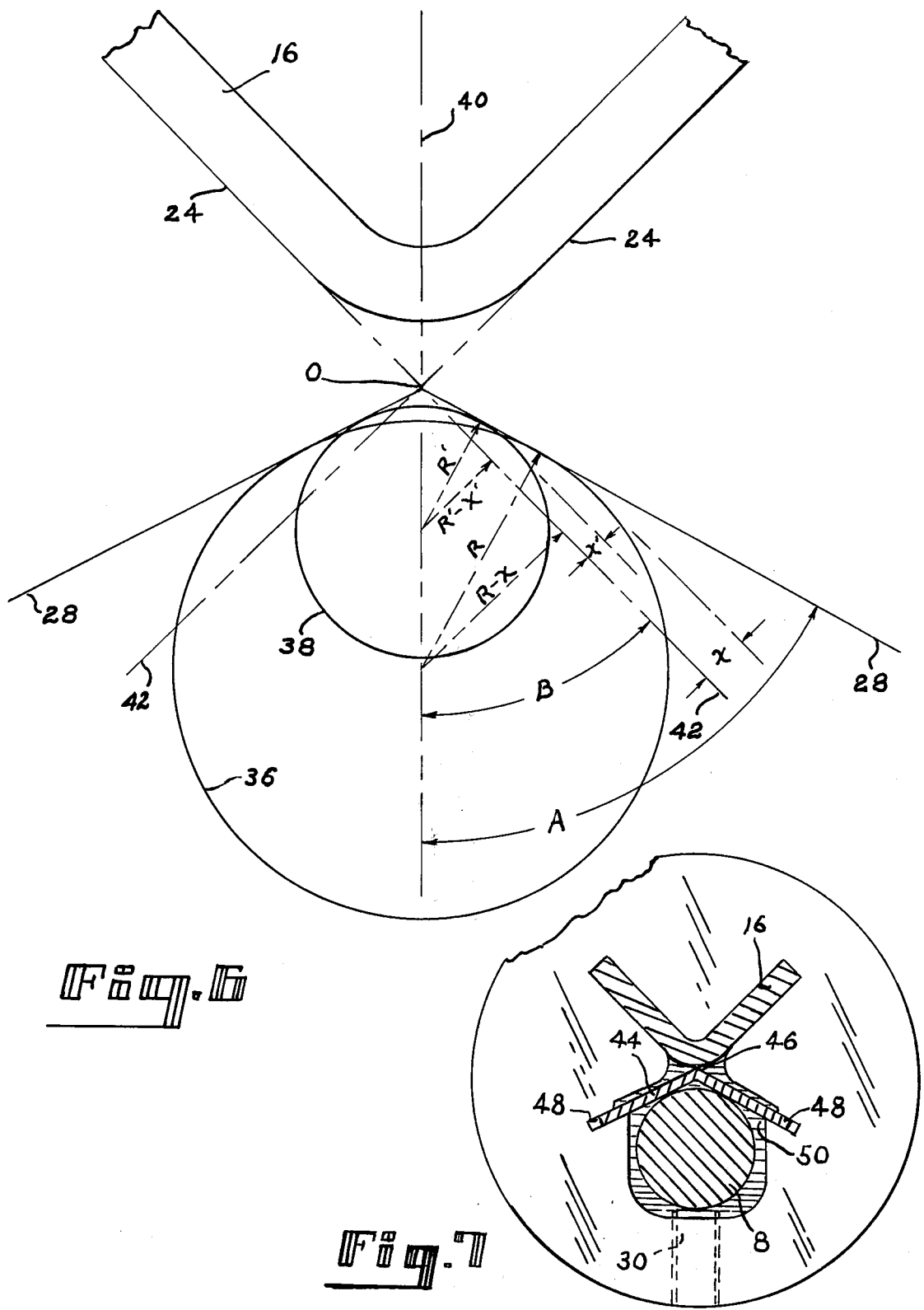

HOLDER FOR CHAIN-SAW SHARPENING FILES

BACKGROUND OF THE INVENTION

The present invention relates to sharpening tools for chain-saws, and it relates more particularly to a holder or fixture for a chain-saw sharpening tool which includes a round file and a V-shaped guide-bar for positioning the file with respect to the cutting edge of each cutter in the saw chain, so that the edge is sharpened at the desired angle.

It is common practice to provide a chain-saw sharpening tool in which the file is mounted at both ends parallel to an elongated guide-bar. This type of tool is used to sharpen saw chains by placing the guide-bar on the top-plate of each cutter with the file engaging the cutting edge, so that it forms a sharp concavely beveled edge as the file is moved longitudinally. In such tools the guide-bar has a pair of gauging-surfaces disposed at an angle to each other so that they form an external V-shaped configuration extending longitudinally of the guide-bar with its apex located adjacent the file. The guide-bar and file are symmetrically fixed with respect to each other with the plane that bisects the angle between the two gauging-surfaces passing through and including the central axis of the file.

In addition to being both parallel and symmetrical with the guide-bar, the file must also be carefully located along the bisector of the angle between the gauging-surfaces such that the periphery of the file projects a predetermined distance beyond the plane of the gauging-surface on each side of the guide-bar. In this way, the working surface of the file is disposed so that it forms the desired angle at the cutting edge when the cutter is being sharpened. The patent to Cox U.S. Pat. No. 2,664,017 disclosed a file holder of this type.

Since the size of the cutters for different chainsaws varies considerably, it is necessary to use a file of the correct diameter for each different size cutter. Heretofore, each size has required a different holder, and to my knowledge no universal holder has ever been provided that will correctly position files of different diameters despite the need therefor, in order to reduce manufacturing costs, inventories and shelf-space for sharpening tools of this kind.

The object of the present invention is to provide a holder for chain-saw files which automatically positions files of different diameters with respect to the guide-bar, so that the desired angle is formed at the cutting edge of the tooth when sharpening chain-saw cutters of a particular size. The advantage of such a holder is that one holder can be made to accommodate any of the commonly used file-sizes for sharpening chain-saws. The manufacturer therefore only has to make one holder instead of three or four, the dealer needs to stock fewer items, and the retailer sells a single holder which will accept any of several size files depending on the size of the cutters for each chain-saw.

SUMMARY OF THE INVENTION

The present invention resides in the provision of a holder for a chain-saw file that has means for positioning a cylindrical file at the correct position relative to the guide-bar regardless of the diameter of the file. Such positioning means include a pair of angularly disposed positioning-surfaces that face from the gauging-surfaces on the guide-bar and form an included angle whose apex coincides with the apex of the angle between the gauging-surfaces. In addition the angle formed by the positioning-surfaces must be centered with respect to the guide-bar and substantially satisfy the equation:

$$\operatorname{Sin} A = \frac{R \operatorname{Sin} B}{R - x}$$

wherein $A$ is an angle equal to one-half the angle between the positioning-surfaces, $B$ is an angle equal to one-half the internal angle between the gauging-surfaces, $R$ is the radius of the file and $x$ is a predetermined linear distance that the periphery of the file should project beyond the plane of each of the gauging-surfaces in order to sharpen the cutting edge of the chain-saw cutter at the desired angle.

A particularly convenient manner of carrying out the invention is simply to provide each end of the holder with a mounting socket or hole large enough to receive any of the files to be used, with the sides of the socket adjacent the guide-bar forming the positioning-surfaces. Each end of the file may then be rigidly fixed or clamped against the positioning-surfaces by means of a bonding screw. It will be understood, however, that various other means of forming the positioning-surfaces, in accordance with the invention, as well as any suitable means for clamping the file in place, may be employed.

DETAILED DESCRIPTION OF PREFERRED EMBODIMENT

With the afore-mentioned background, as well as objects and advantages of the invention in mind, the preferred embodiment of the invention is described hereinafter in conjunction with the accompanying drawings, wherein FIG. 1 is a fragmentary side view of a chainsaw sharpening tool embodying the invention;

FIG. 2 is an enlarged, fragmentary top plan view showing the tool in use on a chain-saw cutter with a portion of the guide-bar broken away to show the file engaging the cutting edge;

FIG. 3 is a vertical sectional view taken on the line 3—3 of FIG. 2, but on a still larger scale;

FIG. 4 is an elevational view of the tool, looking lengthwise of the chain-saw cutter from left to right as seen in FIG. 2;

FIG. 5 is a vertical section through the tool taken along the line 5—5 of FIG. 1, but on the enlarged scale of FIGS. 2 and 4;

FIG. 6 is a diagram showing the geometry of the file-holding fixture with respect to the guide-bar of the tool, and FIG. 7 is an enlarged section similar to FIG. 5 showing a modification of the manner in which the file may be located relative to the guide-bar.

As is well understood in the art, the cutting chain for a chain-saw consists of a series of cutting links connected by drive links. The upper portion of a typical cutting link 2, as illustrated in FIGS. 2–4, is bent to one side and then back upon itself to form a more-or-less horizontal portion 3 which forms the cutting tooth. This horizontal portion or top-plate 3 extends lengthwise of the cutter 2 in the direction in which the chain travels and is sharpened at its forward edge 4 where a gullet or recess 5 is formed in the upper edge of the cutter just rearward of a depth-gauge 6. As shown in FIG. 2 the cutting edge 4 is raked rearwardly usually at a 30° angle, and is hollow-ground on its underside by means of a round file 8, the longitudinal axis of which is disposed parallel to the cutting edge 4 of the cutter.

In order to obtain the optimum cutting action of the saw, it is important to sharpen the cutting edge 4 of each cutter at the correct angle, designated in FIG. 2 as angle E. However, since it is more accurate, as well as more convenient, to take a linear measurement than to measure the angle E, the distance $x$ by which the periphery of the file 8 projects above the top-plate 3 of the cutter is commonly used for determining the correct position of the file relative to the cutting edge 4 so as to produce the desired angle E. In accordance with generally accepted practice in the industry, the distance $x$, which is directly proportional to the angle E, should be equal to approximately 20 percent of the radius of the file.

As in prior chain-saw sharpening tools, file 8 is rigidly mounted in a holder 10 that includes an elongated hollow handle 12, an outer knob 14 and a V-shaped guide-bar 16, one end of which extends into, and is permanently fixed to, the knob 14 by suitable means, such as the roll pin 18 (FIG. 1). In this instance, the opposite end of guide-bar 16 fits freely, but snugly, through a V-shaped opening 20 in the endwall 22 of the handle 12, thereby permitting the handle 12 and knob 14 to be positioned farther apart or brought closer together in order to accommodate files of different lengths. Some suitable means, such as a set-screw 23, should be used to fix the guide-bar 16 in place in the handle 12. Handle 12 and knob 14 hold file 8 so that it extends parallel to guide-bar 16 at a predetermined distance therefrom. The outer faces 24, 24 of guide-bar 16 form the usual gauging-surfaces for engaging the top-plate 3 of each cutter as it is sharpened.

When the tool is used, the file 8 is placed in the gullet 5 of each cutter 2 and the appropriate gauging-surface 24 on the guide-bar 16 is placed on the flat, upper surface of the top-plate 3 as illustrated in FIGS. 2–4. The file is then moved lengthwise while pressure is applied against the cutting edge 4. The appropriate one of a pair sight-lines slight-lines 25 (FIG. 2) is used as a guide for holding the file parallel to the cutting edge 4 as it is being used. Since alternate cutters in a saw chain are reversed so that the top-plate 3 extends in the opposite direction transversely of the chain, it is necessary to reverse the direction in which the file is used and to rotate the tool through 180° about the longitudinal axis of file 8 in order to bring the other gauging-surface 24 of bar 16 into engagement with the top-plate of each reverse cutter.

As hereinbefore indicated, in order to sharpen the cutting edge 4 at the correct angle, it is essential to locate the file 8 along the bisector of the gauging-surfaces 24, 24 so that its working surface projects the desired amount outwardly of the plane of each of the gauging-surfaces on each side of the guide-bar 16. Heretofore, this has been accomplished by locating the openings or sockets in the file holder for the ends of the file at the desired position for each size file, such openings usually being circular and only large enough in diameter to receive the file, so that the file can be clamped rigidly in place relative to the gauging-surfaces. Consequently, it is not possible to use files of different sizes in prior holders, not only because the mounting sockets in those designed for the smaller size files are too small to receive larger files, but more importantly because the portion of the file in engagement with the wall of the socket is located the same distance from the guide-bar regardless of the diameter of the file. Consequently, only files of the one size for which the holder is made will be disposed so that it projects the required distance $x$ above the top-plate 3.

As a result of the present invention, however, a simple, but unique way has been found in which to correctly position files of any desired diameter in the same holder. Thus, as illustrated in FIG. 5, the mounting socket 26 in handle 12 is made large enough to accept a file 8 of the largest diameter contemplated and is provided on the side adjacent guide-bar 16 with a V-shaped wall consisting of a pair of positioning-surfaces 28, 28 symmetrically disposed with respect to the guide-bar 16. A binding screw 30 threaded laterally through a hole into the opening 26 opposite the positioning-surfaces 28, 28 clamps the file 8 rigidly against said positioning-surfaces, thereby fixing the file in the holder at this end. An identical mounting socket 32 (FIG. 1) is provided in the knob 14 for positioning the other end of file 8, which is held in place by a binding screw 34.

An important and fundamental requirement of the present invention resides in disposing the positioning-surface 28, 28 so that regardless of the diameter of the file used, it will be located such that the dimension $x$ equals a given percentage (e.g. 20percent) of the radius of the file. In order to meet this requirement, the angle between the positioning-surfaces 28, 28 must substantially satisfy the equation:

$$\text{Sin } A = \frac{R \text{ Sin } B}{R - x}$$

where $A$ is an angle equal to one-half the angle between the positioning-surfaces 28, 28, $B$ is an angle equal to one-half the internal angle between the gauging-surfaces 24, 24, $R$ is the radius of the file 8 and $x$ is the aforementioned distance that the working surface of the file projects beyond the plane of the gauging-surface.

With reference to the diagram of FIG. 6, the guide-bar 16 is illustrated with its gauging-surfaces 24, 24 disposed at right angles to each other. The angularly disposed positioning-surfaces 28, 28 are shown for the sake of clarity as straight lines that form the V-shaped walls within each of the sockets 26a and 32 in the handle 12 and knob 14, respectively, of the holder 10. It will be noted, moreover, that the apex O of the angle between the positioning-surfaces 28, 28 coincides with the apex of the angle formed by the gauging-surfaces 24, 24. The larger circle 36 represents the periphery of a file 8 having a relatively large radius R, while the smaller circle 38 represents the periphery of a file 8 with a radius R' which is only half the radius of the larger one.

The angle A is accordingly the angle between either of the positioning-surfaces 28, 28 and the bisector 40 of the angle formed by positioning-surfaces 28, 28. Angle B, on the other hand, is the angle between the bisector 40 and the extension 42 of either of the gauging-surfaces 24, 24. The dimension $x$ is the distance which the file 36 projects beyond either extension 42 of the plane of the gauging-surfaces 24, 24, while $x'$ is the corresponding dimension for the file 38. From the foregoing it will be apparent using simply trigonometry that $$\text{Sin } A = \frac{R \text{ Sin } B}{R - x} = \frac{R' \text{ Sin } B}{R' - x'}$$

Consequently, the positioning-surfaces 28, 28 will positively locate any size round file at the precise location required to sharpen the cutting edges of a saw chain at any desired angle corresponding to the distance which the periphery of the file should extend beyond the top-plate of the cutter.

It will also be appreciated that the foregoing relationship for determining the angle between the positioning-surfaces 28, 28 holds for any angle at which the gauging-surfaces on the guide-bar 16 are disposed, the only limitations in this respect being those dictated by practical considerations such as interference between the guide-bar 16 and file 8.

Where the handle 12 and knob 14 are made of plastic, it may be desirable, as shown in FIG. 7, to provide a metal insert 44, against which the file is clamped, in order to prevent the surface of the file from biting into the plastic. It has been found, moreover, that the insert 44 can be used advantageously to fix the guide-bar 16 in position by clamping it against the under edge of bar 16 when the binding-screw 30 is tightened in order to clamp the file 8 in place. Such an arrangement eliminates the need for the set-screw 23 shown in FIG. 1.

To this end, the insert 44 is supported at its center 46 against the rounded corner on the underside of guide-bar 16 and at its outer ends in narrow slots 48, 48 formed in the socket 50 of each holder. The binding screw 30 then forces the insert 44 upward against the guide-bar 16. In order to reduce close manufacturing tolerances, clearance should be provided on both sides of insert 44 adjacent its center 46, thereby ensuring that it seats properly against the bar 16.

What is claimed is:

1. In a chain-saw sharpener having a file-holder for locating the file adjacent its ends at a fixed distance from an elongated guide-bar disposed parallel to the file, said guide-bar having outwardly facing gauging-surfaces disposed at an angle to each other that is symmetrical with the file, the improvement in means for positioning said file relative to said guide-bar at each end comprising a pair of angularly disposed positioning-surfaces facing away from said guide-bar to form an included angle centered with respect to said gauging-surfaces and having its apex coinciding with the apex of the angle between said gauging-surfaces, said included angle substantially satisfying the equation $$\text{Sin } A = \frac{R \text{ Sin } B}{R - x}$$

wherein A is an angle equal to one-half said included angle, B is an angle equal to one-half the internal angle between said gauging-surfaces, R is the radius of said file and $x$ is a predetermined linear distance that the periphery of the file should project beyond the plane of each of said gauging-surfaces in order to sharpen the cutting edge of a chain-saw cutter at a predetermined angle when one of said gauging-surfaces engages the top-plate of the cutter as it is being sharpened, and clamping means for rigidly urging said file against said positioning-surfaces.

2. The improvement in a chain-saw file-holder as defined in claim 1, wherein said means for positioning said file at one end is provided in an elongated hollow handle having an endwall in which a pair of said positioning-surfaces is formed, said endwall having an opening to the interior of said handle for slidingly receiving said guide-bar while supporting it against lateral movement with respect to said handle, said means for positioning said file at its opposite end comprising a knob in which a corresponding pair of said positioning-surfaces is formed, said guide-bar being rigid with said knob in order to prevent movement of said guide-bar in said handle when said file is clamped to said positioning-surfaces in both said handle and said knob.

3. The improvement defined in claim 1, wherein each pair of said positioning surfaces is formed by a V-shaped metal insert, said holder at each end having a socket shaped to receive one of said inserts and to grip said insert at its ends with its center engaging the under edge of said guide-bar in the vicinity of its apex and said clamping means comprising a binding screw threaded laterally through each end of said holder into engagement with the file on its side opposite said positioning-surfaces, such that said insert is driven into engagement with said guide-bar when said binding screw is tightened.

* * * * *